Aug. 13, 1968  L. P. GRAYSON ET AL  3,397,362

OPTICAL LASER CONFIGURATION

Filed Oct. 18, 1966

Inventor
LAWRENCE P. GRAYSON
JAMES H. BOYDEN

By Harry M. Saragovitz,
Edward J. Kelly, Herbert Berl
& S. Dubroff
Attorneys

United States Patent Office 3,397,362
Patented Aug. 13, 1968

3,397,362
OPTICAL LASER CONFIGURATION
Lawrence P. Grayson, Baltimore, Md., and James H. Boyden, Pasadena, Calif., assignors to the United States of America as represented by the Secretary of the Army
Filed Oct. 18, 1966, Ser. No. 588,252
4 Claims. (Cl. 330—4.3)

ABSTRACT OF THE DISCLOSURE

Laser amplifying crystal having at least a portion of each of its ends shaped as a paraboloid such that a coincident focal point exists, either within or outside the crystal. The paraboloids are made reflective to light rays impinging thereon and optically force the rays to make three passes through the crystal.

---

This invention relates to optical lasers and more particularly concerns improved amplifying laser configurations providing beams of light having controlled collimation and divergents.

Lasers provide concentrated, highly directional single-frequency light beams. The process of controlled stimulated emission can be made to occur in several different media, leading to different characteristics and configurations. In a gas laser, excitation can occur by coupling radio frequency or direct current electrical power into the gas to produce excited atoms which decay with an accompanying emission of light. The laser may take the form of a gas-filled tube with partially transmitting mirrors at the end. The light energy is contained by the mirrors in a direction along the axis and goes up in intensity to a threshold level, at which further emitted light along the axis is stimulated and an avalanche of decay resulting from other excited atoms occurs.

In a crystalline laser the active medium is a crystal containing the excitable ions as a dopant, excited or pumped by high intensity light from a flash lamp. Typical examples of crystalline laser materials are ruby, calcium fluoride, doped with uranium or samarium, calcium tungstate doped with neodymium, and the like.

Neodymium, in glass, and the recently developed neodymium and yttrium aluminum garnite, which does not require high intensity pumping, are typical examples of non-crystalline lasers.

Irrespective of the type laser material used, i.e., crystalline, gaseous, or non-crystalline, the generation of truly single pulses devoid of small leading and trailing pulses cannot readily be obtained by current methods or devices. Further, controlled collimation and controlled divergents of light beams is accomplished with undersirable expensive and generally bulky apparatus.

It is therefore an object of this invention to provide a novel laser configuration which overcomes the aforementioned disadvantages.

It is another object of this invention to provide new laser configurations employing easily fabricable components and yet yielding improved amplifying or oscillating characteristics.

Still another object of the invention is to provide new laser configurations permitting amplification characterized by a high gain and an ability to be "cleaned-out" quickly and effectively.

The principles of the invention as well as other objects and advantages thereof will appear clearly from the description of the parts shown in the accompanying drawings, wherein.

Figure 1:
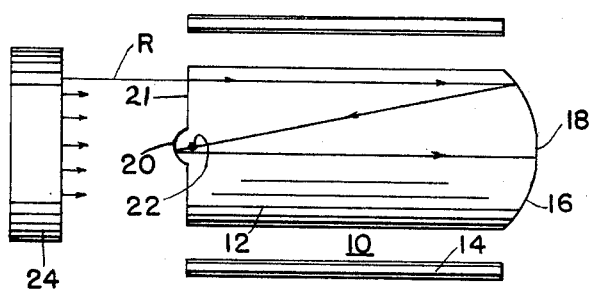
FIG. 1 is a diagrammatic view of our laser configuration, partially cross-sectioned.
Figure 2:
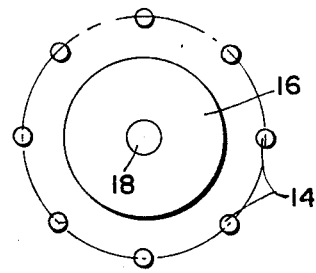
FIG. 2 is an end view of FIG. 1 looking at the device from the exit or output end.

Referring now to the drawings and more particularly to FIGS. 1 and 2, the new laser configuration is shown generally at 10 including a suitable crystal 12, such as a ruby, for example, and a light pumping source 14, such as a series of xenon lamps, spaced concentrically around the crystal. The crystal 12 has its output end shaped as a paraboloid (FIG. 1), the entire outer portion of which is coated with a 100% metal or dielectric reflecting medium 16 while its central portion 18 remains uncoated to permit rays to pass through. A smaller paraboloid element 20, also coated with a 100% reflecting medium has a focus 22 common with paraboloid 16. Around the smaller paraboloid 20 is a flat uncoated surface 21 which allows light impinging thereon to pass therethrough. Light from an exciting source 24, which may be a standard laser, for example, gaseous or solid state, emits light rays therefrom, a typical ray being represented by R, which passes through the input or entrance end of crystal 12 near the exciting source and strikes paraboloid 16, is reflected back to paraboloid 20 which directs the rays through "tunnel" portion of the crystal 12 and out at 18. It is evident therefore that each ray or incoming beam is optically forced to pass three times through crystal 12, all of the rays exiting therefrom through the "tunnel" at 18, and emitted in a vary narrow, highly collimated beam. The narrowness of the beam cross-section is directly dependent on a distance from coincidence focal point 22 to paraboloid 20.

Figure 3:
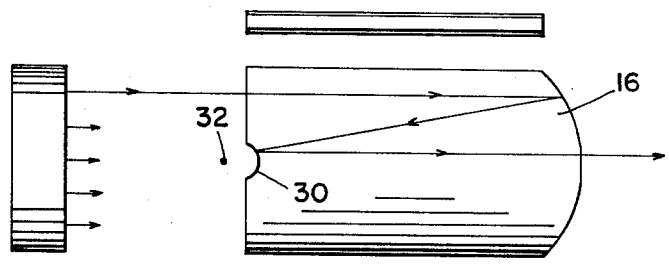
FIGS. 3 and 4 are modifications of the basic device.
Figure 4:
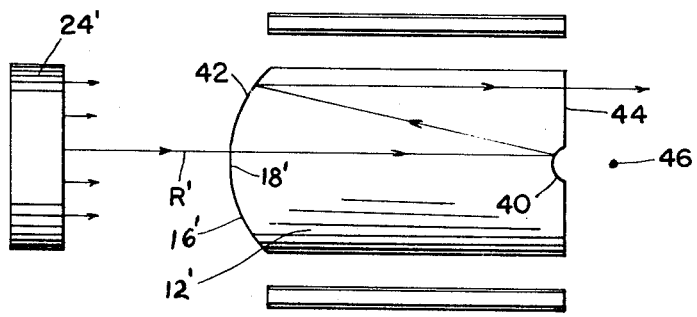

The smaller paraboloid reflecting element 30 of FIG. 3 is the reverse of that shown in FIG. 1, and its coincident or common focal point with reflector 16 is located at point 32. In the amplifier depicted in FIG. 1, or as modified in FIG. 3, the output beam will have a higher energy density and smaller diameter than the input beam from the exciting source but will provide greater divergence than the input beam. If a beam of larger diameter and reduced divergence is desired, then the modification of FIG. 4 will be used. A typical ray R' emitted from a suitable exciting source 24' passes through an uncoated portion 18' of crystal 12', impinges on small paraboloid elements 40 having a 100% totally reflecting surface coated thereon, is reflected to large paraboloid 42 also 100% reflecting and is directed through the crystal and out at 44. The common focal point of the paraboloids is shown at a point 46, or paraboloid 40 may be reversed such that its focal point will coincide with the focal point of paraboloid 16' within the crystal.

In practice, the atoms of crystal 12 are pumped initially to the higher of two energy states by any suitable outside source, shown in the drawings as a pumping source 14. In order that a pulse be generated, however, an exterior exciting source of appropriate wavelength must emit a bundle of parallel rays into our configurated or shaped crystal. An appropriate excitor may be an optical laser employing the same material as the inventive device. By so doing, a nearly parallel beam of light of appropriate frequency will readily be provided. Since the structured crystal was placed in a state of inverted atomic population by the pumping source, and the frequency of the incoming beams from the exciting source corresponds to the energy difference between the inverted states, it is apparent that amplification will occur during the three passes through the crystal. Further, since any photon can make only three passes through the crystal, the maximum rate of depletion of the upper state by spontaneous emission will be limited and may possibly eliminate any need for Q-switching. All parallel rays entering the crystal at the same time will also be emitted simultaneously resulting in single, sharp pulse devoid of small leading and trailing pulses.

Obviously, modifications may be made to the inventive device in light of the above disclosure. For example, the foci of the two paraboloidal reflecting surfaces may be adjusted so that a nearly parallel beam entering the device will be emitted nearly parallel, similar in operation to the normal plane-parallel-ended optical lasers. Further, the flat ends 21 and 18 may be made partially reflecting, partially transmitting, by being coated. This allows the device to function as an oscillator. Similarly, the paraboloids of the amplifying devices may be substituted by properly adjusted spheres; and so on.

We claim:

1. An optical laser configuration suitable for amplification purposes and the like, comprising
    a crystal having an entrance end and an exit end,
    means for externally pumping light rays of certain wavelengths into said crystal, such that atoms therewithin are pumped to the higher of two energy states,
    other means for introducing parallel light rays into said entrance end of said crystal, said light rays having a wavelength corresponding to the difference in energies of said two energy states,
    said laser being so shaped that said light rays entering said entrance end of said crystal are optically forced to pass three times through said crystal, said exit end of said crystal forming a first paraboloid, said first paraboloid having an outer portion thereof totally reflective and its central flat portion totally transmissive, said entrance end of said crystal having an outer transmissive portion normal to the path of rays emitted by said other means and a central portion forming a second paraboloid totally reflective to rays reflected from said outer portion of said first paraboloid, said paraboloids having a coincident focal point outside said crystal and between said second paraboloid and said other means such that all rays entering said crystal pass through said central portion of said exit end.

2. An optical laser configuration suitable for amplification purposes and the like, comprising
    a crystal having an entrance end and an exit end,
    means for externally pumping light rays of certain wavelengths into said crystal, such that atoms therewithin are pumped to the higher of two energy states,
    other means for introducing parallel light rays into said entrance end of said crystal, said light rays having a wavelength corresponding to the difference in energies of said two energy states,
    said laser being so shaped that said light rays, entering said entrance end of said crystal are optically forced to pass three times through said crystal, said entrance end of said crystal forming a first paraboloid, said first paraboloid having an outer portion thereof totally reflective and its central portion totally transmissive, said exit end of said crystal having an outer transmissive portion and a central portion forming a second paraboloid totally reflective to rays emitted from said other means, said paraboloids having a coincident focal point outside the crystal and beyond said exit end thereof such that all rays entering said crystal pass through said outer portion of said exit end.

3. An optical laser configuration suitable for amplification purposes and the like, comprising
    a crystal having an entrance end and an exit end,
    means for externally pumping light rays of certain wavelengths into said crystal, such that atoms therewithin are pumped to the higher of two energy states,
    other means for introducing parallel light rays into said entrance end of said crystal, said light rays having a wavelength corresponding to the difference in energies of said two energy states,
    said laser being so shaped that said light rays entering said entrance end of said crystal are optically forced to pass three times through said crystal, said exit end of said crystal forming a first paraboloid, said first paraboloid having an outer portion thereof totally reflective and its central flat portion totally transmissive, said entrance end of said crystal having an outer transmissive portion normal to the path of rays emitted by said other means and a central portion forming a second paraboloid totally reflective to rays reflected from said outer portion of said first paraboloid, said paraboloids having a coincident focal point within said crystal such that all rays entering said crystal pass through said central portion of said exit end.

4. An optical laser configuration suitable for amplification purposes and the like, comprising
    a crystal having an entrance end and an exit end,
    means for externally pumping light rays of certain wavelengths into said crystal, such that atoms therewithin are pumped to the higher of two energy states,
    other means for introducing parallel light rays into said entrance end of said crystal, said light rays having a wavelength corresponding to the difference in energies of said two energy states,
    said laser being so shaped that said light rays entering said entrance end of said crystal are optically forced to pass three times through said crystal, said entrance end of said crystal forming a first paraboloid, said first paraboloid having an outer portion thereof totally reflective and its central portion totally transmissive, said exit end of said crystal having an outer transmissive portion and a central portion forming a second paraboloid totally reflective to rays emitted from said other means, said paraboloids having a coincident focal point within said crystal such that all rays entering said crystal pass through said outer portion of said exit end.

References Cited

UNITED STATES PATENTS

| | | | |
|---|---|---|---|
| 3,205,370 | 9/1965 | Ashkin et al. | 330—4.3 |
| 3,253,226 | 5/1966 | Herriott et al. | 330—4.3 |
| 3,307,113 | 2/1967 | Hughes | 330—4.3 |

ROY LAKE, *Primary Examiner.*

DARWIN R. HOSTETTER, *Assistant Examiner.*